(12) United States Patent　　(10) Patent No.: US 7,548,724 B2
Berkheimer et al.　　　　　　　(45) Date of Patent: Jun. 16, 2009

(54) METHOD AND APPARATUS FOR EASILY CHANGING THE MENU OF A JUKE BOX

(75) Inventors: John Robert Berkheimer, Scottsdale, AZ (US); Miles Martin Elmers, II, Phoenix, AZ (US)

(73) Assignee: Tyrell Corporation, Phoenix, AZ (US)

( * ) Notice: Subject to any disclaimer, the term of this patent is extended or adjusted under 35 U.S.C. 154(b) by 623 days.

(21) Appl. No.: 11/215,657

(22) Filed: Aug. 30, 2005

(65) Prior Publication Data

US 2006/0078851 A1　　Apr. 13, 2006

Related U.S. Application Data

(60) Provisional application No. 60/610,875, filed on Sep. 17, 2004.

(51) Int. Cl.
*G09B 5/00*　　　(2006.01)
(52) U.S. Cl. ..................................... 434/317
(58) Field of Classification Search ................. 312/8.5, 312/8.7; 720/615, 616; 434/317; 40/531
See application file for complete search history.

(56) References Cited

U.S. PATENT DOCUMENTS

| 4,831,758 | A | * | 5/1989 | Williams et al. ............... 40/510 |
| 5,253,234 | A | * | 10/1993 | Ogawa et al. ............ 369/31.01 |
| 5,438,674 | A | * | 8/1995 | Keele et al. ..................... 711/4 |
| 5,455,926 | A | * | 10/1995 | Keele et al. ..................... 711/4 |
| 2003/0149628 | A1 | * | 8/2003 | Abbosh et al. ................ 705/16 |
| 2007/0297295 | A1 | * | 12/2007 | Travagin .................. 369/30.06 |

* cited by examiner

*Primary Examiner*—Ronald Laneau
(74) *Attorney, Agent, or Firm*—The Hill Law Firm; Scott A. Hill

(57) ABSTRACT

The present invention is a method and apparatus that allows a menu 20 of song titles 22 to be displayed on printed pages 24, rather than on small song cards, that are held by page frames 30 that are hingedly joined to a juke box unit. The printed pages can be changed by positioning a page frame under a hatch, which is an opening 50 that preferably includes a lid 52, and slipping different pages in an out through a thin slot 32 on the top of a page frame. The front of the juke box housing 10 has a hollow 58 that a user can fit their fingers into to manipulate flipping handles 56 that are fixed to the page frames such that the user can turn and position the printed pages for either changing out the printed pages or for browsing the menu of song titles.

20 Claims, 2 Drawing Sheets

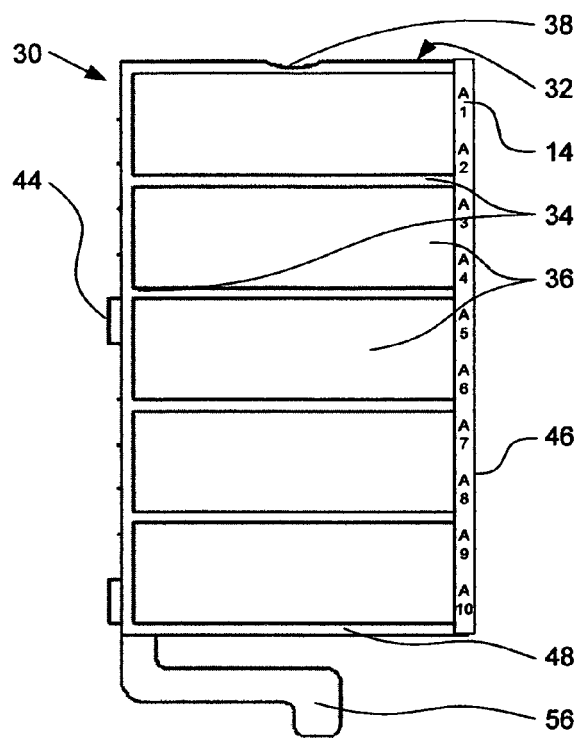
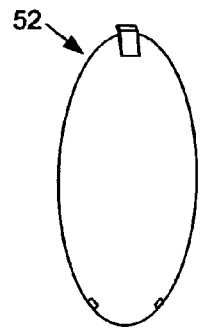
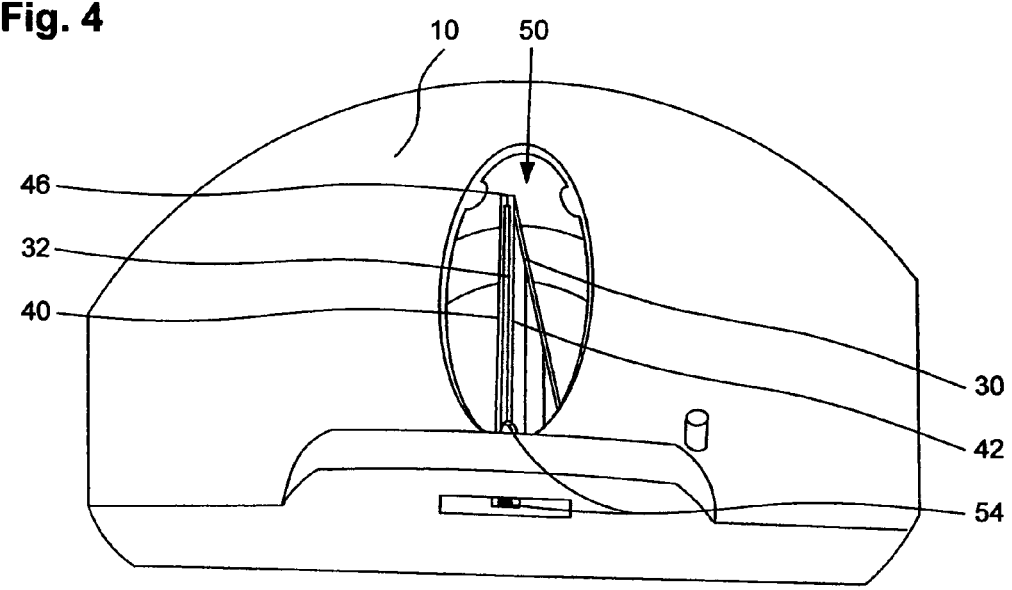

METHOD AND APPARATUS FOR EASILY CHANGING THE MENU OF A JUKE BOX

CROSS REFERENCE TO RELATED APPLICATION

The present application is related to and claims priority under 35 U.S.C. 119(e) to U.S. Provisional Patent Application Ser. No. 60/610,875 filed Sep. 17, 2004, entitled "DIGITAL AUDIO PLAYER", the contents of which are hereby incorporated by reference in their entirety.

BACKGROUND OF THE INVENTION

Vintage juke boxes from the 40's and 50's had a simple and effective user interface. Their song library was printed on numerous small song cards arranged on page frames, often with a page turning mechanism similar to those shown and described in U.S. Pat. Nos. 5,253,234 and 6,249,999, and each song was assigned an access code such as "J7" or "512". Music was played back from records, which often had songs on both sides of the disc, so an update of a record selection usually required a qualified serviceman to open up the housing of the juke box. With two sided records being the standard, music selections usually had to be updated in pairs. An update included changing both the record selection and song cards. Since updates required so much work, they were usually not done until several new songs were to be updated. This was usually done by disassembling the outside housing and sliding the song cards sideways out of the page frames. Because it was unusual to update all selections on a whole page at one time, many of the original song cards for popular song titles were not changed. Therefore, each page frame held several smaller strips, each displaying two song selections.

Larger systems added "wall box" remote controls, most often seen at the tables in 50's diners, which allowed customers to easily select music without leaving their seat. These larger systems were popular even though they were complex, expensive and difficult to maintain. Few examples remain operational today. Juke box systems are still popular, such as those shown and described in U.S. Pat. Nos. 6,031,795 and 6,587,403, but modern juke boxes use CD's instead of records for the playback of music, which may increase the number of selections available in some systems. However, no modern production juke box product currently offers wall box remotes as an option.

SUMMARY OF THE INVENTION

In order to enable more people to play music at home from a large selection of songs without needing more technical understanding, the present invention utilizes elements of a "vintage" 50's juke box in combination with the operation of a digital audio player having improvements to enhance functionality and ease of use. The result is a portable table system similar to a tabletop radio, but that will look more like a "wall box" remote from a 50's diner. The product has quick and easy access to at least 100 songs and does not require knowledge of a PC to change the available music selections. A CD based MP3 player system is preferred so that it can play commercially made compatible music CD's or it is easily updatable on a user's PC with new music selections.

In the present invention, the page frames have been modified to allow numerous songs to be changed at the same time by allowing entire pages of song titles, rather than numerous small song cards, to be slipped in and out of the tops of our new page frames. This is done by manually positioning a page frame to be updated with an easily opened hatch in the top of the juke box unit, so the juke box housing does not need to be disassembled. All music selections can be changed at the same time by replacing a single CD or other digital storage source, which is preferably easily accessed on the back of the unit. With our improved method and apparatus, even a grade school child can easily update a juke box in just a matter of minutes. The printed pages may be purchased with the CD, or printed on a personal computer. To listen to music, a user browses for song selections on the menu by flipping through the printed pages. Song selections are assigned access codes that are printed on the printed pages, molded into the page frames, or otherwise affixed to the page frames. Music from a corresponding CD can then be played by selecting the proper access code.

BRIEF DESCRIPTION OF THE DRAWINGS

FIG. 3 is an elevation view of a page frame.

FIG. 4 is a top view of the juke box, with the lid removed, showing the opening and the top of a page frame.

FIG. 5 is a bottom view of the lid that was removed from the juke box of FIG. 4.

Figure 1:
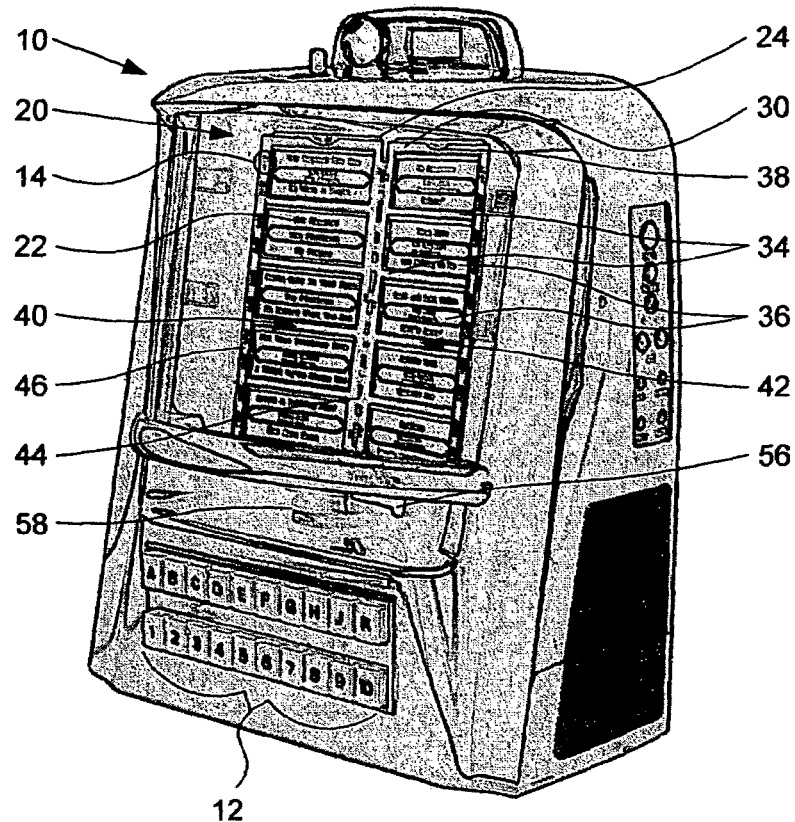
FIG. 1 is a perspective view of the appearance of a juke box that incorporates the most preferred embodiment of the present invention.

The following is the menu of numerical callouts used in FIGS. 1-4:
10 Juke box housing
12 Track selection keys
14 Access code
20 Menu
22 Song title
24 Printed page
30 Page frame
32 Thin slot
34 Frame dividers
36 Windows
38 Finger relief
40 Left frame face
42 Right frame face
44 Hinged vertical edge
46 Free vertical edge
48 Bottom edge
50 Opening
52 Lid
54 Release mechanism
56 Flipping handles
58 Hollow
60 Ledge

DETAILED DESCRIPTION OF THE INVENTION

The most preferred embodiment of the present invention is a mobile or portable juke box designed for storage and playback of digital audio files, with elements from a vintage juke box "wall box" found in a 50's diner. Those of ordinary skill in the art will appreciate that the appearance shown in the various figures may vary depending on the system implementation. For example, the system may have many different configurations of possible styles for the printed pages or page frames, and the system could also be floor size. The depicted examples are not meant to imply architectural limitations with respect to the present invention. Although this description will discuss our most preferred embodiment, these preferences are not intended to exclude suitable or functionally equivalent alternatives.

As seen in FIG. 1, the present invention has a modified juke box housing 10 that incorporates the improvements described herein, but many of our juke box's features strongly resemble a vintage system in appearance. There are track selection keys 12 that are used to enter access codes 14 for playback of music. A menu 20 of song titles 22 is displayed on printed pages 24 that are held by page frames 30. The printed pages can be changed by positioning a page frame under a hatch, shown in FIGS. 4 and 5, which is an opening 50 on the top of the juke box housing that preferably includes a lid 52, and slipping different pages in an out through a thin slot 32 on the top of a page frame. There is a hollow 58 that a user can fit their fingers into to manipulate flipping handles 56 that are fixed to the page frames such that the user can turn and position the printed pages.

Figure 2:
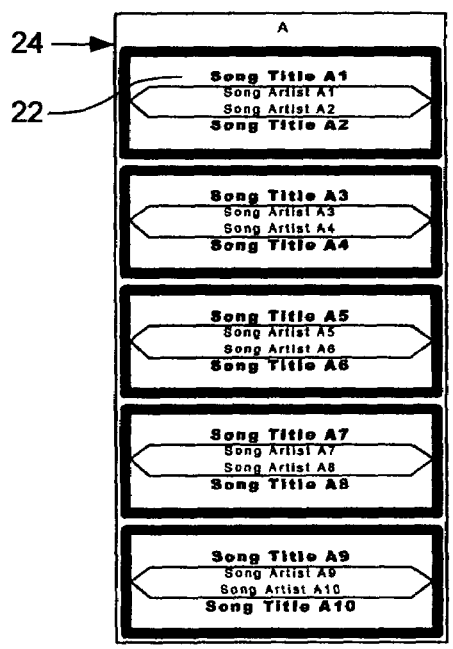
FIG. 2 is an elevation view showing a sample of a preferred format of the printed pages.

To operate the system, a user browses the song titles 22 displayed on the menu 20. The menu is typically maintained on five or more printed pages 24, similar to a vintage juke box. Preferably, the printed pages are made from heavy paper, plastic, cardboard, or photo paper. Printed colors may be used for decorative or identification purposes. Adjacent each of the song titles, there is an access code 14 that is at least partially comprised of symbols, preferably one alpha symbol and one numeric symbol. The printed pages may additionally include artist information, and two sided printing on the printed pages is preferred, though not necessary. Access codes may be entered by a user to request playback of digital audio files associated with song titles. The access codes displayed on the menu may be either molded or affixed, such as by adhering a strip bearing access codes, to the page frame itself. Alternatively, the access codes may simply be printed onto the printed pages. A user may enter a song selection by actuating a combination of track selection keys 12 bearing the symbols of the access code identified with a song title. FIG. 2 shows an example of the format of printed pages that could be used with a 10×10 menu of song titles, noting that the printed pages are usually displayed as pairs within the juke box unit. The access codes are shown along an outside border of each page to follow convention, but location of the access codes is a matter of preference.

For a large system, such as a 24×24 layout of song titles, the printed pages may be grouped more tightly to save space such that twenty four pages can show twenty four songs per page, for a total of 576 possible song titles and access codes. A 24×24 layout preferably uses a row of alpha keys "A" through "Z", skipping letters "I" and "O" to avoid confusion, and a row of numeric keys "1" through "24". It should be noted that the access codes for a 10×10 layout can be duplicated by a 24×24 layout such that the same access code plays the same song on either system up to the limits of the system. This type of uniformity would allow the same digital media to be used on different systems, but only larger systems would have full access to all stored files. Another alternate layout includes a 14×14 layout that uses an alpha row of track selection keys "A" through "P" and a numeric row of track selection keys "1" through "14". For the printed pages of a 14×14 layout to fit into a 10×10 system, the bottom four song titles can be broken off and the last four of fourteen printed pages can be set aside or discarded.

Yet another alternate layout includes a 20×10 layout that uses a first alpha row of track selection keys "A" through "K", a second alpha row of track selection keys "L" through "V", and a numeric row of track selection keys "1" through "10". A music CD with 200 tracks can be sold in a format that will operate effectively in either a 100 song unit or a 200 song unit. This CD would come with printed pages. When the CD is purchased for use in a 100 song format player, the customer can break off or otherwise not display the song titles provided on the printed pages that can not be accessed. For example, a 10 page frame system can accept 10 double sided printed pages, but a five page frame system can only accept and display 5 of the 10 printed pages. Using this approach track J7 will remain consistent in both players, which is required to avoid distributing two sets of printed pages. This also offers the advantage that both these customers can use each others players more easily, should they happen to know each other.

The track selection keys 12 may include as many rows of keys as desired, and the symbols don't need to be alpha or numeric. The two rows of track selection keys shown in FIG. 1 may be supplemented by one or more additional track selection keys. A supplemental key is useful for further distinguishing an access code of a particular song title from access codes of other song titles on the menu. For example, supplemental Red and Blue track selection keys could be added as part of another row of keys that must be selected as a separate symbol of an access code, preferably indicating the color of a printed page, so there could be a "Red J7" and a "Blue J7". The best approach would be to supply custom software for a PC which would keep track of the media files assigned to each access code and would be capable of writing or "burning" the CD and printing the printed pages, including colors.

A page frame 30, shown in FIG. 3, is used to display a printed page in a comfortable viewing manner for users. At the top of the page frame there is a thin slot 32 through which printed pages can be exchanged. The page frame is rectangular in shape. There are preferably frame dividers 34 for additionally holding the printed pages in the page frames as well as defining numerous windows 36 that clearly outline the printed song titles into pairs or groups that are easier to view compared to an unbroken list. The frame dividers should have beveled top edges so that printed pages can be more smoothly channeled into the thin slot. A finger relief 38 is provided along the top edge of each page frame so that it is easier to pull a printed page out of a page frame. A typical page frame will display a list of ten songs, two songs in each of five frames, although variations in the number of song selections are expected.

The page frames are preferably molded plastic, such as polypropylene or polyethylene. An inexpensive way to form the thin slot of a page frame is to mold a left frame face 40 and a right frame face 42 that are substantially mirror images of each other. One or both of the frame faces should include a thicker U-shaped border. When the frame faces are secured to each other, such as by a snap-fitting, heating or gluing, the thicker border holds the frame faces in spaced relation to each other to create the thin slot. The thicker border of an assembled page frame will have a hinged vertical edge 44, a free vertical edge 46 and a bottom edge 48. The hinged vertical edge is hingedly joined to a hinge means that is fixed in relation to the juke box housing. The free vertical edge preferably displays the access codes. The bottom edge prevents a printed page from slipping all the way through the thin slot.

The thin slot 32, shown in FIG. 4, is open along a top edge of each page frame 30 such that a printed page 24 can be slipped into or out of a page frame. FIG. 4 shows that there is a hatch, which is an opening 50 on the top of the juke box that is normally covered by a lid 52, that is preferably flush with a top surface of the juke box housing. The lid that was removed from the juke box of FIG. 4 is shown in FIG. 5. The hatch provides the necessary opening required to manipulate printed pages into and out of the juke box housing 10. The lid, shown in FIG. 5, can preferably be completely removed from the juke box housing so there is a minimum of interference when slipping printed pages through the opening. The opening should have at least one ledge 60 that aligns the lid flush with the opening and prevents the lid from falling into the juke box. The preferred hatch has approximate dimensions of ten centimeters by five centimeters in an oval shape. The lid may be made of the same material as the juke box housing such that it is not an obvious feature.

There is a release mechanism 54 that can be pressed or pulled to assist with the removal of the hatch lid 52. A simple release mechanism is all that is needed, such as a lever arm that is pressed to apply a force against the lid from the inside of the juke box housing 10 until the lid at least partially pops up to where it can be grasped. Other known hatch designs and release mechanisms may be used, such as those used with battery covers on electronic devices, or even a more complex magnetic push-click latch, like those commonly used on cabinet doors. Alternatively, instead of a release mechanism, a finger-sized indentation on the lid may be used to pinch or scoop the lid open with a user's finger.

Once the hatch is opened, a printed page 24 can be inserted into the juke box housing 10. A page frame 30 needs to be in the right position to be able to slip a printed page into the thin slot 32. Positioning the page frame is done by reaching into a hollow 58 that is part of the juke box housing. The hollow substantially lays between the menu 20 and the track selection keys 12. With a user's fingers, each page frame can be flipped or positioned by manipulating flipping handles that are joined to the bottom edge 48 of the page frames. The flipping handles are elongated tabs that are preferably molded as part of one or both of the frame faces 40 and 42.

The overall function of the juke box unit may be enhanced by adding a radio tuner that provides signals in the system. When the radio tuner is being used, the track selection keys can alternately function as preset buttons for storing and selecting radio stations. Printed pages that are similar to the printed pages that display the menu can be added to display a list of preset radio station memories. Since the unit will have twenty or more track selection keys, a large number of station memories can be quickly accessed by pressing a single key.

While a preferred form of the invention has been shown and described, it will be realized that alterations and modifications may be made thereto without departing from the scope of the following claims.

What is claimed is:

1. An apparatus for easily changing the menu of a juke box comprising:
   at least two printed pages for displaying a menu of song titles on pages rather than on small song cards;
   at least two page frames that are hingedly joined to the juke box, each page frame having a thin slot for holding at least one of the printed pages;
   an opening in a top part of the juke box that provides access to the at least two page frames such that the at least two printed pages can be slipped out of the page frames and up through the opening; and
   wherein printed pages can be slipped down through the opening and into the page frames for displaying a menu of song titles.

2. The apparatus of claim 1 further comprising a lid for covering the opening when the menu is not being changed.

3. The apparatus of claim 2, wherein the lid normally rests flush with a top portion of the juke box, further comprising a release mechanism for at least partially removing the lid.

4. The apparatus of claim 1 further comprising access codes that are on the page frames adjacent the song titles.

5. The apparatus of claim 1 further comprising access codes that are printed on the printed pages adjacent song titles.

6. The apparatus of claim 1 wherein the printed pages are supplied with corresponding media files.

7. The apparatus of claim 1 wherein the printed pages can be formatted and printed on a personal computer.

8. The apparatus of claim 1 wherein the page frames are characterized by frame dividers that visually separate each of the printed pages such that it appears as though there are numerous smaller printed cards.

9. The apparatus of claim 1 wherein each of the page frames is characterized by a finger relief.

10. The apparatus of claim 1 further comprising a hollow that provides mobility for flipping handles, the flipping handles at least being useful for positioning the page frames while changing the song selections of the juke box.

11. A method for changing the menu of a juke box comprising the steps of:
    arranging song titles on numerous printed pages;
    positioning page frames so they are substantially below an opening on a top part of the juke box, the page frames being hingedly joined to the juke box; and
    slipping the printed pages through the opening and into the page frames.

12. The method of claim 11 further comprising the step of placing a lid over the opening after changing the menu of the juke box.

13. The method of claim 12 further comprising the step of operating a release mechanism that at least partially separates the lid from the opening.

14. The method of claim 11 further comprising the step of fixing access codes to the page frames.

15. The method of claim 11 wherein the step of positioning page frames is characterized by reaching into a hollow and moving flipping handles that are attached to the page frames.

16. The method of claim 11 wherein the page frames are characterized by frame dividers that each have at least one beveled edge.

17. The apparatus of claim 11 further comprising the step of arranging a list of radio stations on at least one of the numerous printed pages.

18. The apparatus of claim 11 further comprising the step of breaking off at least some of the song titles arranged on the numerous printed pages.

19. A method for changing the song selections of a juke box comprising the steps of:
    at least partially changing the media files available to the juke box;
    hingedly joining a first page frame to the juke box;
    arranging at least 5 song titles on a first printed page;
    positioning a thin slot along a free vertical edge of the first page frame substantially adjacent an opening on the side of the juke box; and
    slipping the first printed page through the opening and into the thin slot of the first page frame.

20. The method of claim 19 wherein the step of positioning the first page frame is characterized by reaching into a hollow and moving a flipping handle that is attached to the page frame.

* * * * *